United States Patent Office 2,938,380
Patented May 31, 1960

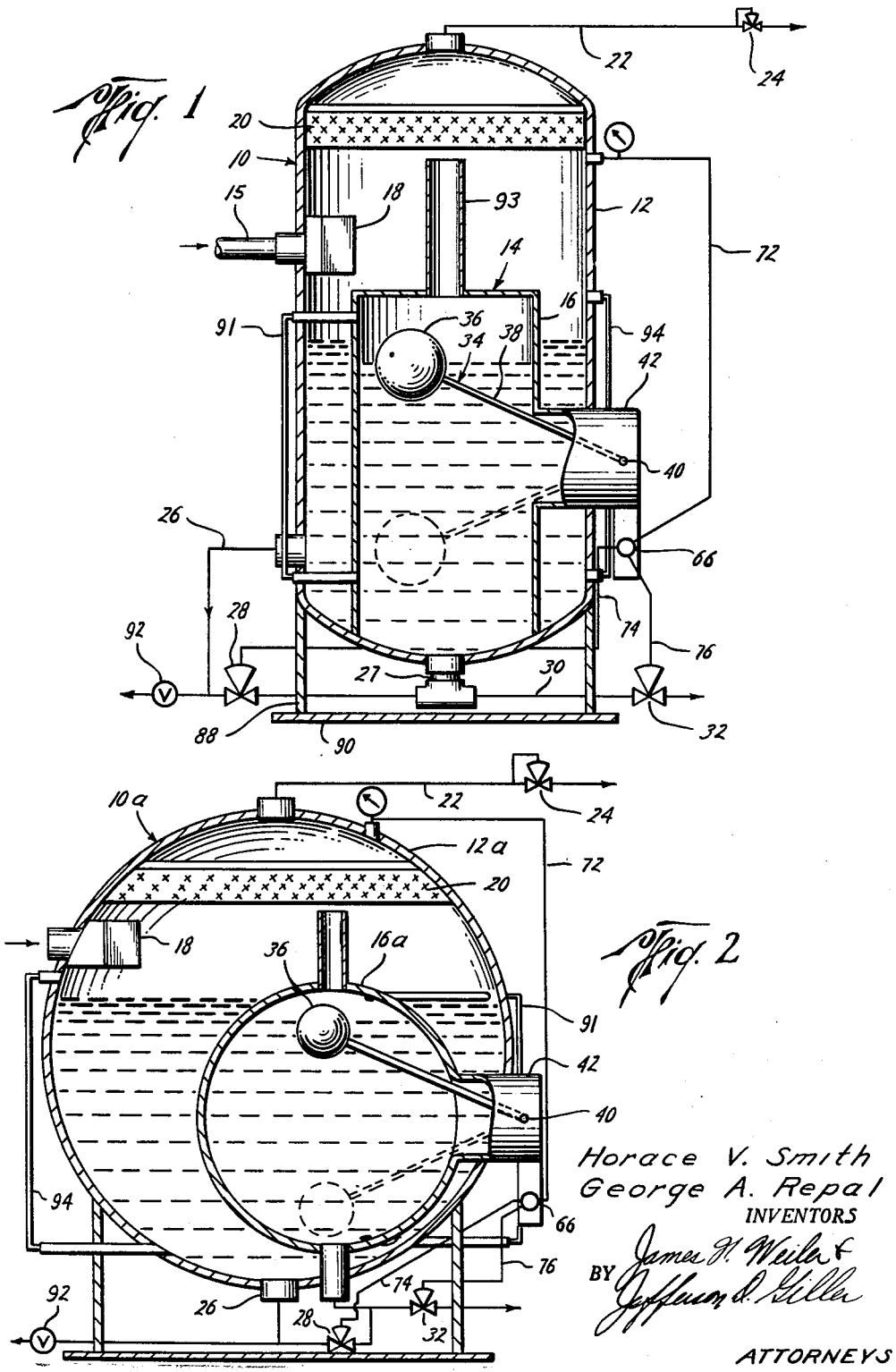

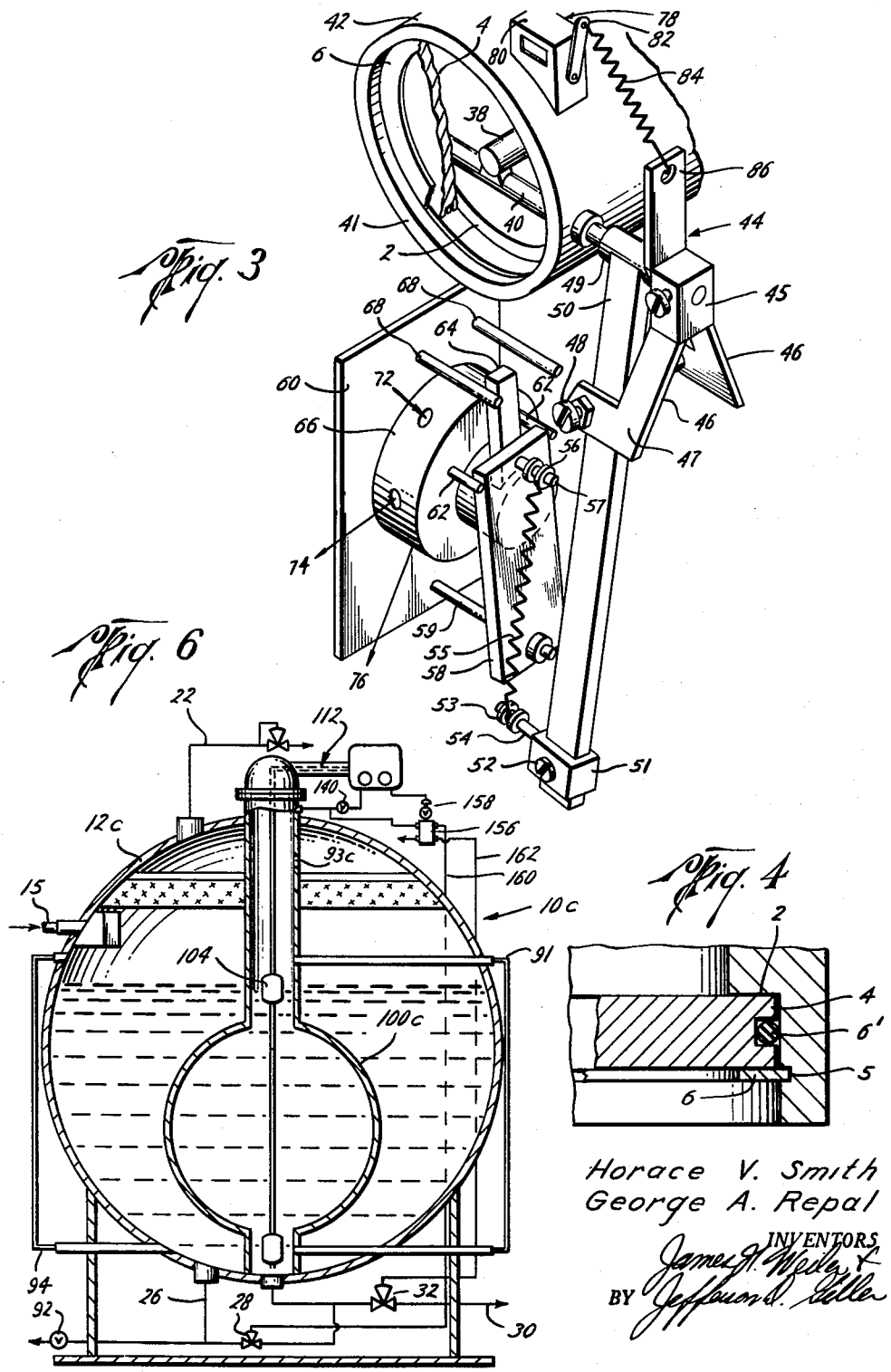

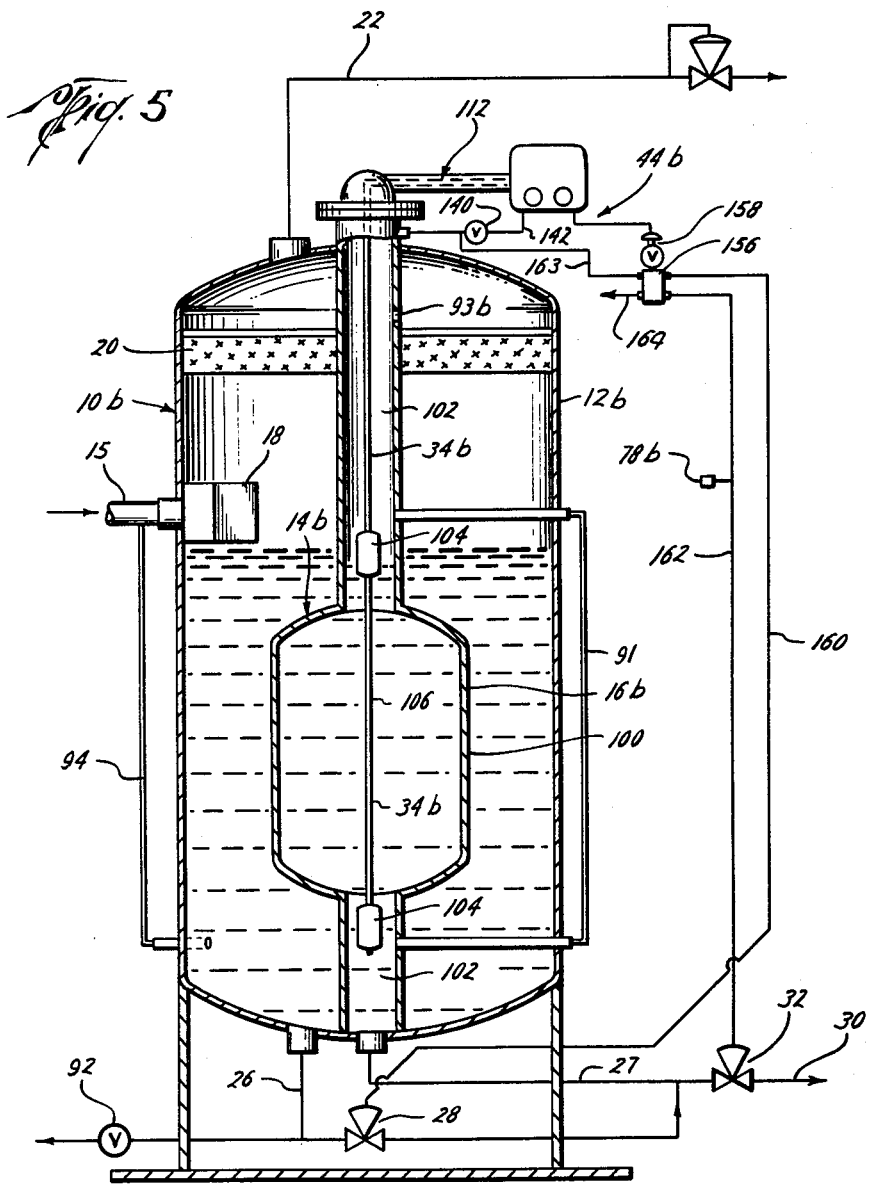

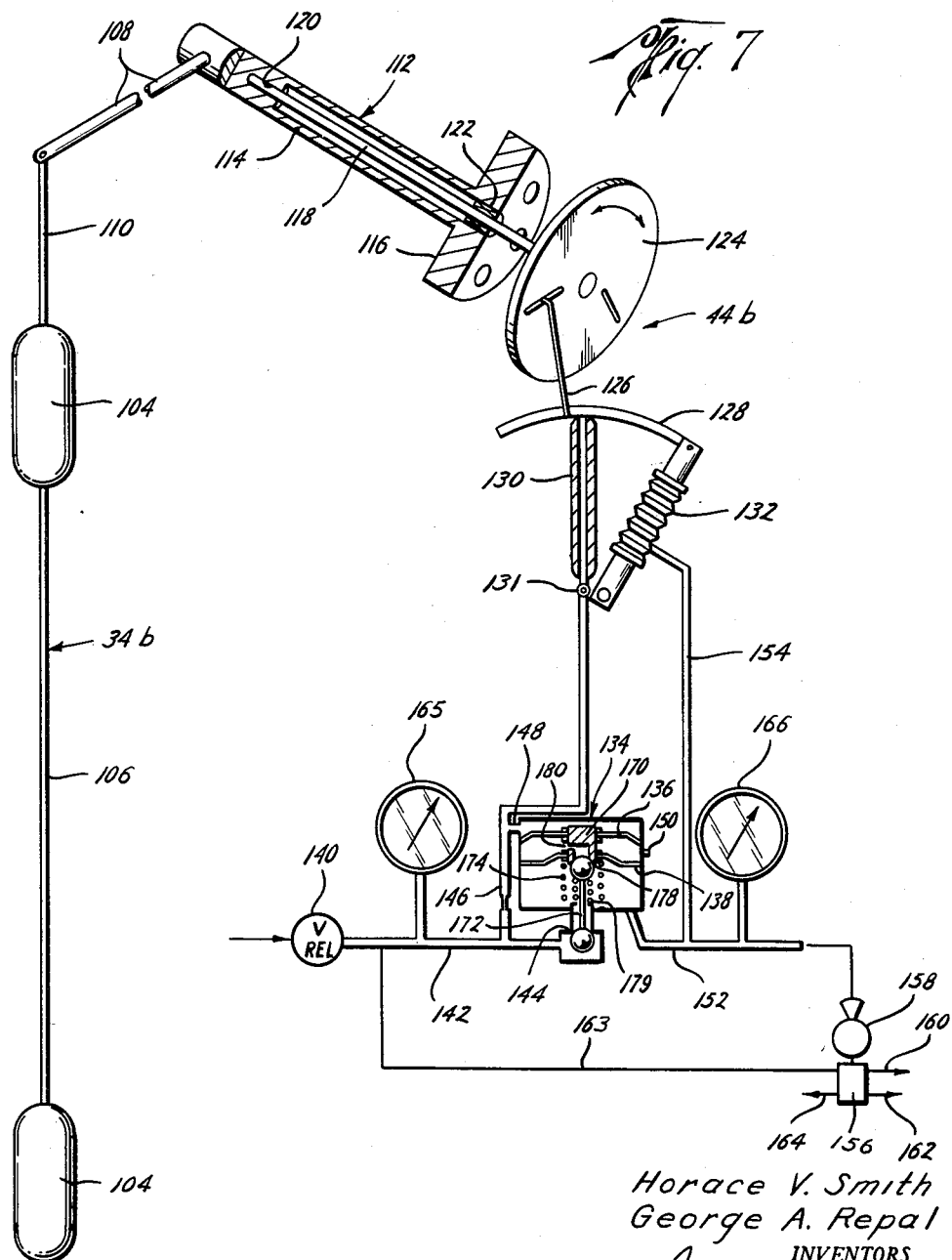

2,938,380

LIQUID METERING SEPARATOR

Horace V. Smith and George A. Repal, Houston, Tex., assignors to Oil Metering and Processing Equipment Corporation, Houston, Tex., a corporation of Texas Filed Oct. 15, 1956, Ser. No. 615,886

11 Claims. (Cl. 73—200)

The present invention relates to an improved liquid metering separator and, more particularly, relates to a liquid metering separator in which the metering chamber is enclosed within the separator chamber.

There is a need for a relatively inexpensive, yet reliable, accurate and efficient liquid metering separator for use in connection with the separation of oil and gas from oil and gas wells and the metering of the liquid therefrom. Also, in the use of liquid metering separators there is oftentimes a need for a conservation of space occupied by the liquid metering separator and many of the units now available occupy more space than is available or desirable in certain instances.

Accordingly, it is a major object of the present invention to provide an improved liquid metering separator which efficiently and reliably separates and meters large volumes of liquid under pressure such as in connection with oil and gas from oil and gas wells and gathering systems therefor and the like.

A further object of the present invention is to provide a liquid metering separator which is comparatively economical to construct and which occupies a minimum of space.

Yet a further object of the present invention is to provide a liquid metering separator in which the metering chamber is located within the separator chamber.

And still another object of the present invention is the provision of a liquid metering separator in which the metering chamber is within the separator chamber and yet which has the various control elements on the outside of the separator chamber so that repairs and adjustments and the like may be made from the outside.

Other and further objects, features, and advantages will be apparent from the following description of the presently preferred examples of the invention, given for the purpose of disclosure and taken in conjunction with the accompanying drawings, where like character references designate like parts throughout the several views, and where:

Figure 1 is a partly diagrammatic and partly sectional side elevation of one form of the liquid metering separator of the present invention, Figure 2 is a view similar to Figure 1 illustrating a modification of Figure 1, Figure 3 is a perspective view of a valve control mechanism and counting assembly for use with the liquid metering separators illustrated in Figures 1 and 2, Figure 4 is an enlarged fragmentary cross-sectional view of the snap ring arrangement illustrated in Figure 3, Figure 5 is a partly diagrammatic and partly sectional side elevation illustrating another modified form of the liquid metering separator of the present invention, Figure 6 is a view similar to Figure 5 illustrating a modification of the form of invention illustrated in Figure 5, and Figure 7 is a partly diagrammatic, partly sectional perspective view illustrating the valve actuating mechanism used in the modifications of Figures 5 and 6.

Referring now to the drawings, and particularly to Figure 1, the liquid metering separator indicated generally by the numeral 10 includes as a whole the separator chamber 12 and the metering unit indicated generally by the numeral 14 of which the metering chamber or liquid container 16 is located within the separator chamber 12.

The upright generally cylindrical separator chamber 12 has the fluid inlet 15 for introducing well fluid into the separator chamber 12 and a conventional inlet deflector 18 at the inlet 15 so that gas in the fluid flows upwardly through a conventional screen or mist extracting element 20 located adjacent the upper end of separator chamber 12, and the liquid falls to the lower part of the separator chamber 12 around the liquid container 16. A gas outlet line 22 passing through a conventional back pressure valve 24 is provided in the upper end of the separator chamber 12 to remove gas therefrom. A discharge line 26, which also serves as an inlet line to the liquid container 16 of the metering unit 14 through the flow line 27, is provided in the lower portion of separator chamber 12 and supplies liquid from the separator chamber 12 into the liquid container 16 in response to the actuation of the inflow valve 28 as will be made clear later. The liquid outflow line 30 is also connected to the lower part of the liquid chamber 16 through flow line 27 and is controlled by the outflow valve 32 so that upon simultaneous actuation of the valves 28 and 32 liquid fills and drains the liquid container 16. As will be presently described, these valves are simultaneously controlled by a valve actuating mechanism and the metering unit may be calibrated to provide a highly accurate and efficient metering of the liquid flowing into and out of the liquid container 16.

Disposed within the liquid container 16 is the float assembly 34 which includes the float 36 rigidly secured to one end of the float arm 38 which, as seen in Figure 3, has its other end rigidly secured to a pivotally mounted control arm 40 extending out of the nozzle 42 extending from one side of the liquid container 16 to the exterior of the separator chamber 12. Thus, as the float 36 rises and falls with changes of liquid level in the liquid container 16 the float arm 38 causes a rotation of the control arm 40 for actuating the valve actuating mechanism indicated generally by the numeral 44 as best seen in Figure 3.

The valve actuating mechanism 44 includes a link or hanger 45 rigidly secured to the outer end of the control arm 40, to which link 45 is secured a pair of generally L-shaped brackets 46. Disposed in the free end 47 of each L-shaped bracket 46 is a set screw 48 by which suitable adjustment may be made for calibrating the valve actuating mechanism 44, as will be presently described.

Rotatably secured at its upper end to the control arm 40, such as by the journal bearing 49, is the downwardly extending arm 50. On the lower portion of this arm 50 is the slidable sleeve 51 which may be secured in any position along the arm 50 by means of the adjusting nut 52. Secured through a grooved rotatable sleeve 53 to the pin 54 extending from the sleeve 51 is the tension spring 55 which is secured at its other end through a grooved rotatable sleeve 56 to the pin 57 of the pivot arm 58. The pivot arm 58 pivots about the shaft 59 mounted in a plate 60 and has the projections 62 that strike the pilot pivot arm 64 of the pilot valve 66 which pilot valve 66 is also a part of the valve control mechanism 44. Movement of this pilot pivot arm 64 by the projections 62 actuates the pilot valve 66.

It is to be noted that the pivot arm 58 and the arm 50 are mounted for pivotal movement parallel to one another. Further, the tension spring 55 is connected to the arm 50 on one side of the shaft 59 forming the pivot point of the pivot arm 58 and connected to the pivot arm 58 on the other side of its shaft 59. Thus, the tension of the spring 55 tends to hold the pivot arm 58 on whatever side of the shaft 59 the lower end of the spring 55 is.

To prevent the pilot pivot arm 64 from damaging the pilot valve 66 when this pilot pivot arm 64 is thrown from side to side by the projections 62, a pair of stops 68 secured to the plate 60 extend outwardly to each side of the pilot pivot arm 64. These stops 68 are spaced so that the pilot pivot arm 64 has sufficient movement to operate the pilot valve 66, but the stops 68 are placed close enough together to prevent damage to the pilot valve 66.

This valve actuating mechanism 44 other than the pilot valve 66 is claimed in Patent No. 2,818,738, granted January 7, 1958, to H. V. Smith et al. for Snap Acting Mechanism.

In operation of the valve control mechanism 44, as the control arm 40 is rotated by means of a swinging movement of the float arm 38 a corresponding movement is transmitted to the L-shaped brackets 46 through the link or hanger 45. This causes the inner ends of the set screws 48 to contact the arm 50 and cause it to move first in one direction and then in the other direction in response to movement of the float 36 as described. As the arm 50 moves from one side to the other tension on the spring 55, when it passes a vertical line through the shaft 59 of the pilot arm 58, snaps the pivot arm 58 from one extreme position to the other. As the pivot arm 58 is oscillated on the shaft 59 the projections 62 strike the pilot pivot arm 64 actuating the pilot valve 66. Because the pivot arm 58 does not tend to move the pilot pivot arm 64 until a pin 62 strikes the pilot pivot arm 64, any initial creeping movement of pilot arm 58 due to action of the tension spring 55 is not transmitted to the pilot pivot arm 64 so there is no creeping of the pilot valve 66 from one position toward the other and the pilot valve 66 is snap acted by the striking of one of the pins 62 against the pilot pivot arm 64 when the tension of the spring 55 finally snaps the pivot arm 58. Varying the distance between the inner end of the set screws 48 and the arm 50 calibrates the valve actuating mechanism 44 by varying the liquid level at which the pilot valve 66 is actuated.

The pilot control valve 66 may be of any preferred type of which several are readily available on the commercial market. A satisfactory valve is Pilot Valve Model CFI–CI manufactured by the Clayton Valve Company (Cla-Val) of New Port Beach, California. Accordingly, no detailed description thereof is necessary.

A pressure line 72 connected to the separator chamber 12 (see Figures 1 and 3) supplies pressure to the pilot valve 66 and through it to the pressure lines 74 and 76 extending from the pilot valve 66 to the inflow and outflow valves 28 and 32 respectively. These inlet and outlet valves 28 and 32 may be any preferred type of double acting pressure responsive valve such as Kimray Model SMT–DA manufactured by Kimray Inc., Oklahoma City, Oklahoma, and accordingly no further description of them is necessary.

A dump counter or recorder mechanism 78 (see Figure 3) is provided so that an accurate count is automatically maintained of each time the liquid container 16 fills and empties. Such dump counter or recorder mechanism may include a conventional counter 80 having its actuator arm 82 secured by a tension spring 84 to the end of the arm 86 which is rigidly secured to the control arm 40 and oscillates therewith so that oscillations of the arm 86 through the action of the spring causes oscillations of the actuator arm 82 on the counter 80 recording the number of times the liquid container 16 empties and fills. Any conventional counter or recorder mechanism may be used, a number of which are on the commercial market and, accordingly, no detailed description thereof is deemed necessary.

For ease of access to the interior of liquid container 16 in the vicinity of the control arm 40 (see Figures 3 and 4), the nozzle 42 is counterbored at its end 41 to form the shoulder 2 against which rests the circular closure plate 4. An annular slot 5 is cut in the counterbored portion of the nozzle 42 adjacent to the outer surface of the closure plate 4 into which annular slot 5 is fitted the snap ring 6. Because of its tendency to expand this snap ring 6 stays securely in the annular slot 5 until removed and holds the closure plate 4 tightly in position. A conventional O-ring packing 6' may be used to help form a fluid tight seal between the closure plate 4 and the nozzle 42.

The liquid metering separator 10 may obviously be supported by any suitable framework or structure and, for this purpose, the supports 88 (see Figure 1) connected to the separator chamber 12 and the base ring 90 are illustrated. The liquid container 16 may be supported in any convenient method within the separator 12.

A conventional liquid level gauge 91 is provided to indicate the liquid level in the liquid container 16 and another liquid level gauge 94 permits observation of the liquid level in the separator chamber 12.

The operation of the liquid metering separator 10 of Figures 1 and 3 is as follows. Fluid, such as oil and gas, is permitted to enter the well fluid inlet 15 which fluid upon passing through the inlet deflector 18 separates into liquid and gas with the gas rising through the screen or mist extracting element 20 and passing out the gas outlet line 22. The oil falls into the lower portion of the metering chamber 12 around the exterior of the liquid container 16 from which space oil passes through the inflow line 26. As water may accumulate in the lower portion of the metering separator 10 a drain valve 92 in the inlet line 26 provides for drainage.

The oil flowing through the inflow line 26, the opened valve 28, and the flow line 27 flows into the interior of the liquid container 16 because of the head of liquid in the separator chamber 12 and the pressure equalized pipe 93 at the top thereof which maintains a substantially equal pressure in the liquid container 16 and the separator chamber 12. The outflow valve 32 is closed during such filling of the liquid container 16. The float 36 rises with the liquid in the liquid container 16 until it reaches a predetermined point where it causes the arm 38 to rotate the control shaft 40 to such an extent that a set screw 48 engages the arm 50 causing it to move. This in turn snaps the pilot valve arm 64 which actuates the pilot valve 66 thereby providing pressure to the inflow valve 28 and draining pressure from the outflow valve 32 causing a simultaneous closing and opening, respectively, of these valves. This permits liquid in the liquid container 16 to empty out the outflow line 30 until the liquid reaches a predetermined level where the float 36 reaches the refilling point and reverses the valve actuating mechanism 44 thereby causing a simultaneous closing of the outflow valve 32 and an opening of the inflow valve 28 permitting liquid to again flow into the liquid container 16 repeating the cycle. The counter assembly 78 records each time the liquid container 16 has been filled and emptied thereby giving an accurate indication thereof.

As the pressure in the liquid container 16 is of the same order as that in the separator chamber 12 the metering separator 10 can be operated at atmospheric pressure or otherwise. However, if the metering separator 10 is operated at atmospheric pressure or less, extraneous gas at a suitable pressure is applied to the pilot valve 66 for actuation of the inflow and outflow valves 28 and 32.

Turning now to Figure 2 there is illustrated a modification of the liquid metering separator of Figure 1 in which the reference letter "a" has been added to parts modified from those illustrated in Figure 1 for convenience of reference. The modification of Figure 2 is nearly identical to the form of Figure 1 except that it illustrates a metering chamber 12a and a liquid container 16a which are each of general spherical configuration.

Referring now to Figure 5, a further modification is illustrated with modified parts having the reference letter "b" added for convenience of reference. In this modification the liquid metering unit 14b is modified from the form shown in Figure 1 but in all other respects the liquid metering separator 10b is nearly identical to that shown in Figure 1.

The liquid container 16b has the main storage chamber 100 with upper and lower Seraphin type necks 102 of reduced diameter. The reduced diameter necks 102 are known in their trade as Seraphin necks in view of the discovery by T. A. Seraphin, U.S. Patent No. 1,277,760, granted September 3, 1918. The shape of a vessel with the enlarged main central storage portion 100 and reduced diameter necks 102 is conventional practice in the art and this particular shape in a metering vessel is recommended by the ASME–API petroleum P.D. Meter Code No. 1101.

Disposed within the liquid container 16b is the float assembly 34b which includes a divided pair of floats of buoyancy masses 104 disposed in the reduced diameter portions 102 of the liquid container 16b, which divided buoyancy masses 104 are rigidly connected together by the rod 106. It should be noted that the divided buoyancy masses 104 never move out of the reduced diameter portions 102 thereby insuring highly accurate results.

As best seen in Figure 7, the divided buoyancy masses 104 are pivotally connected to a crank arm 108 by the rigid arm 110, the crank arm 108 being rigidly connected to the valve control mechanism 44b which in this modification includes a torsion tube assembly, generally designated by the reference numeral 112. It should be noted that while a divided buoyancy mass is illustrated, a single elongate mass of constant or other diameter may be used.

The torsion tube assembly 112 includes a torsion tube 114 to which the crank arm 108 is rigidly connected, which torsion tube 114 is also rigidly connected to the stationary flange 116 so that the torsion tube may be torqued due to the movement of the divided buoyancy masses 104. A rod 118 is disposed within the torsion tube 114, which rod is rigidly secured to the head of the torsion tube 114, as at 120, but rotatably extends through the flange 116 and the bearing 122 to the disc 124.

A hanger 126 is connected to the rotatable disc 124 and to what might be termed a curved piece 128 which rests upon the upper end of the nozzle 130 and which is pivotally secured at one end to the bellows assembly 132. While not shown, in practice the nozzle 130 is adjustable for calibration purposes. Thus, rotation of the rod 118 in a clockwise direction causes a corresponding rotation of the disc 124 and an elevation of the curved piece 128 thereby opening the upper end of the nozzle 130; whereas, rotation of the rod 118 in a counterclockwise direction causes a corresponding rotation of the disc 124 and a lowering of the curved piece 128 to bring it to the position illustrated in Figure 7 for closing the upper end of the nozzle 130 thereby preventing pressure from bleeding through this upper end.

A pressure control pilot valve 134 is also provided as part of the valve control mechanism 44b which pilot valve 134 includes a pair of diaphragms 136 and 138 to which a regulated supply of gas is provided from the upper neck 102 through the regulator valve 140 and line 142 through the pilot valve 144 to the underside of the diaphragm 138 and through the leg 146 to the nozzle 130 and through the connected leg 148 to the upper side of the upper diaphragm 136. A bleed port 150 is provided to bleed fluid pressure from the space between the diaphragms 136 and 138. Pressure is supplied from below the control valve diaphragm 138 and into the pressure line 152 and from the bellows 132 into the pressure line 154 joining the pressure line 152 which is connected to a four-way relay valve, generally indicated by the reference numeral 156 with its actuator 158 which four-way relay valve 156 is connected by the pressure lines 160 and 162 to the inflow valve 28 and the outflow valve 32, respectively, as best seen in Figure 5. Pressure to actuate the inflow and outflow valves 28 and 32 is supplied through the four-way relay valve 156 by the line 163 connected to the line 142 from the upper neck 102. Exhaust line 164 bleeds pressure from valves 28 and 32 through the four-way valve 156 when valves 28 and 32 are to be opened. No detailed description is given of the four-way valve 156 and its actuator 158 as this may be any conventional type desired of which several are available on the market. A four-way relay valve assembly including an actuator Model 19–38–60 manufactured by the Valvair Corporation, Akron, Ohio, is quite satisfactory.

The supply gauge 165 is connected in the pressure inflow line 142 and an output gauge 166 is connected in the pressure outflow line 152.

The operation of the valve control mechanism 44b is as follows: As the float assembly 34b is moved slightly upward and down in response to the liquid level in the necks or reduced diameter portions 102 of the main storage chamber 100, it causes the torsion tube 114 to be torqued in one direction or the other which causes a corresponding rotation of the rod 118. This in turn causes a rotation of the disc 124 causing the curved piece 128 to be lifted away from the upper end of the nozzle 130 or seated thereon. When the curved piece 128 seats on the upper end of the nozzle 130, as illustrated, and cuts off escape of gas through this nozzle 130, a pressure increase occurs on the upper side of the diaphragm 136 which because it is rigidly connected to the diaphragm 138 by a spacer 170 causes both diaphragms to move downwardly and push the doubled ended valve assembly 172 down opening pilot valve 144. This permits gas under pressure in line 142 to flow into the space below diaphragm 138 and into the line 152 to the four-way relay valve 156 for actuating the four-way valve 156. The pilot valve 144 remains open only until the force on the lower diaphragm 138 area reaches an equilibrium with the loading pressure on the upper diaphragm 136 area. When this happens the coil spring 174 pushes both diaphragms 136 and 138 upwardly causing the pilot valve to close through the action of spring 179.

When movement of the float assembly 34b causes the curved piece 128 to uncover the upper end of nozzle 130 the pressure in pressure control pilot 134 above the diaphragm 136 is relieved and the greater pressure momentarily existing below diaphragm 138 causes diaphragms 136 and 138 to move upwardly opening valve 178 in pressure control pilot 134. This allows gas under pressure to pass from below diaphragm 138 through the port 180 into the space between the diaphragms 136 and 138 and out the bleeder port 150. Equilibrium will again cause pilot valve 144 to close.

Such operation causes an "on-off" pressure to be applied to the four-way relay valve 156 for controlling the supply of actuating pressure from line 163 to the various valves in the system as previously mentioned.

No more detail description is deemed necessary of the particular valve control mechanism 44b illustrated in the Figure 7 as all of it except the float assembly 34b and the four-way relay valve 156 is a commercial assembly readily available on the market manufactured by Black, Sivalls and Bryson, Inc. of Tulsa, Oklahoma, and is known as a Climax Control Type 887 with 1450 pilot. Other satisfactory units are available from Fisher Governor Co., Mason-Neilan Co. and others.

A counter assembly 78b is provided, such as in the pressure line 162 to the outflow valve 32, so that an accurate count is automatically maintained of each time the vessel fills and empties. The counter assembly 78b is diagrammatically illustrated, but any conventional counter mechanism or recorder may be used, a number of which are on the commercial market and, accordingly, no detail description thereof is deemed necessary.

The operation of the liquid metering separator 10b of Figure 5 is as follows. Well fluid from a well enters through the inlet 15 into the separator chamber 12 with the gas flowing out the line 22 and liquid collecting in the lower portion as described in the description of the operation of the liquid metering separator of Figure 1. Liquid from the lower part of the separator chamber 12 flows through the inflow line 26 when valve 28 is open and in turn flows up through flow line 27 into the interior of the liquid container 16b because of the head of liquid in the separator chamber 12, the outflow valve 32 being closed. When the liquid in the liquid container 16b reaches a predetermined level, such as that illustrated in Figure 5, the float assembly 34b has moved upwardly thereby causing the valve control mechanism 44b to be actuated to provide pressure to the inflow valve 28 thereby closing this inflow valve 28 and relieving pressure from the outflow valve 32 thereby simultaneously opening this latter valve. This permits the liquid in the liquid container 16b to drain out the flowline 27 and outflow line 30 until the liquid reaches a predetermined level in the lower neck 102 where the float assembly 34b lowers slightly thereby applying torque to the torsion tube 112 in the opposite direction and thereby actuating the valve control mechanism 44b causing a simultaneous closing of the outflow valve 32 and an opening of the inflow valve 28 permitting liquid to again flow into the liquid container 16b thereby repeating the cycle. The gas equalizing connection 93b causes the pressure in the liquid container 16b and the separator chamber 12 to be the same so there is no pressure resistance to the filling of the liquid container 16b. The counter 78b accounts or records each time the vessel has been filled and emptied thereby giving an accurate indication thereof.

As the pressure in the liquid container 16b is of the same order as that in the separator chamber 12 this metering separator 10b like the metering separators 10 and 10a can be operated at atmospheric pressure or otherwise. However, if the metering separator 10b is operated at atmospheric pressure or less, extraneous gas at suitable pressure is supplied to the pressure control pilot 134 and the four-way valve 156.

It should be noted that the liquid may flow into the metering separator 10b in large volumes and under high pressures without interfering with the operation or accuracy of the unit. Also, the divided buoyancy masses 104 do not move out of the reduced diameter portions or necks 102 thereby insuring very accurate and reliable results because of the large size of the buoyancy masses 104 in the reduced diameter portions 102.

It should also be noted that in practice the unit is calibrated by rotating the nozzle 130 about its pivot 131 and by adjusting the nozzle 130 with a micrometer screw, not shown.

If desired, the inlet valve 28 and outlet valve 32 in the modification shown in Figure 5 may be opened and closed by the application of pressure rather than by applying and bleeding off pressure, for example, with a four-way relay pilot valve 156 available from Fisher Governor Company of Marshalltown, Iowa. In addition, other buoyancy actuated liquid level controls may be used for controlling the operation of the four-way valve 156 upon movement of the float assembly 34 such as for example the Bourdon tube type and commercial controls such as there are available; for example, Type 2503-249P, Top Mounting Liquid Level Controller and Type 2500S-249P from Fisher Governor Company, Marshalltown, Iowa.

Referring now to Figure 6, there is shown a further modification of the present invention where modified portions are indicated by the suffix "c." This modification in Figure 6 is nearly identical to that shown in Figure 5 except that the separator chamber 12c and the main storage chamber 100c are spherical instead of generally cylindrical in shape. Operation of this modification is identical to the operation of the form illustrated in Figure 5.

While the present invention has been described in connection with metering and separating oil and gas, it will be understood that the invention may be used for metering any type of liquid and gas under any and all pressure conditions and in combination with various other apparatus.

The present invention therefore, is well suited to carry out the objects and attain the advantages and ends mentioned as well as others inherent therein. Accordingly, the invention is to be limited only by the spirit thereof and the scope of the appended claims.

What is claimed is:

1. A liquid metering separator comprising, a separator chamber; means for introducing liquid and gas into the separator chamber; outlet means at the upper end of the separator chamber for discharging gas therefrom; and a liquid metering unit including, a liquid container positioned within the separator chamber so as to be contained within the liquid in the separator chamber, a liquid inlet passage into the liquid container from the lower part of the separator chamber, a liquid outlet passage from the lower part of the liquid container to the exterior of the separator chamber, inlet and outlet valves in the passages, a float assembly in the liquid container movable with changing liquid level in the said liquid container, and a valve control mechanism exterior of the separator chamber actuated by movement of the float assembly in one direction for simultaneously opening and closing the inlet and outlet valves respectively, and for simultaneously closing and opening the inlet and outlet valves respectively, upon movement of said float assembly in the other direction.

2. The liquid metering separator of claim 1 including a counter mechanism for counting each time the liquid container fills and drains.

3. The liquid metering separator of claim 1 in which the float assembly includes a float in the liquid container adapted to float on liquid in the liquid container, a float arm rigidly connected at one end to the float and connected at its other end to the valve control mechanism.

4. A liquid metering separator comprising, a separator chamber; means for introducing liquid and gas into the separator chamber; outlet means at the upper end of the separator chamber for discharging gas therefrom; and a liquid metering unit including a liquid container positioned within the separator chamber so as to be contained within the liquid in the separator chamber, a liquid inlet passage into the liquid container from the lower part of the separator chamber, a liquid outlet passage from the lower part of the liquid container to the exterior of the separator chamber, inlet and outlet valves in the passages, a float in the liquid container adapted to float on liquid in the liquid container, a float arm rigidly connected at one end to the float, a rotatably supported control arm rigidly secured to the other end of the float arm, an adjustable engaging member disposed exteriorly of the separator chamber and rigidly connected to the control arm, a pilot valve assembly, a snap acting assembly connected to and actuating said pilot valve assembly, said snap acting assembly engageable by said adjustable engaging member for actuating said pilot valve assembly, and a pressure system actuated by said pilot valve assembly for actuating the inlet and outlet valves whereby movement of said float in one direction simultaneously opens and closes said inlet and outlet valves respectively, and movement of said float in the other direction simultaneously closes and opens said inlet and outlet valves respectively.

5. The liquid metering separator of claim 4 including a counter mechanism for counting each time the liquid container fills and drains.

6. The liquid metering separator of claim 4 including a nozzle extending from the liquid container to the exterior of the separator chamber, said nozzle containing a portion of the float arm and the control arm, a shoulder in the nozzle adjacent its exterior end, a closure plate in said nozzle contacting the shoulder, an annular slot interior of the nozzle adjacent the exterior of the closure plate, and a snap ring in said slot whereby the closure plate is releasably held adjacent the shoulder.

7. A liquid metering separator comprising, a separator chamber; means for introducing liquid and gas into the separator chamber; outlet means in the separator chamber approximate its upper end for discharging gas therefrom; and a liquid metering unit including a liquid container positioned within the separator chamber so as to be contained within the liquid in the separator chamber, said liquid container having a main storage chamber and mutually aligned liquid compartments extending above and below said main storage compartment, said mutually aligned compartments being of materially smaller cross section than that of said main storage compartment and being in liquid communication therewith, a liquid inlet passage into the liquid container from the lower part of the separator chamber, a liquid outlet passage from the lower part of the liquid container to the exterior of the separator chamber, inlet and outlet valves in the passages, a buoyancy member comprising a pair of buoyancy masses rigidly connected together, one of each said buoyancy masses being disposed in one of each of the said mutually aligned compartments, said buoyancy masses movable with changing liquid level in said mutually aligned compartments, and valve control mechanism exterior of the separator chamber actuated by movement of said buoyancy member in one direction for simultaneously opening and closing the inlet and outlet valves respectively, and for simultaneously closing and opening the inlet and outlet valves respectively, upon movement of said buoyancy member in the other direction.

8. The liquid metering separator of claim 7 including a counter mechanism for counting each time the liquid container fills and drains.

9. In a liquid metering separator the improvement comprising, a separator chamber adapted to receive a liquid and a gas; and a liquid metering unit including a liquid container positioned within the separator chamber so as to be contained within the liquid in the separator chamber, a liquid inlet passage into the liquid container from the lower part of the separator chamber, a liquid outlet passage from the lower part of the liquid container to the exterior of the separator chamber, inlet and outlet valves in the passages, a float assembly in the liquid container movable with changing liquid level in said liquid container, and a valve control mechanism exterior of the separator chamber actuated by movement of the float assembly in one direction for simultaneously opening and closing the inlet and outlet valves respectively, and for simultaneously closing and opening the inlet and outlet valves respectively, upon movement of said float assembly in the other direction.

10. In a liquid metering separator the improvement comprising, a separator chamber adapted to receive a liquid and a gas; and a liquid metering unit including a liquid container positioned within the separator chamber so as to be contained within the liquid in the separator chamber, a liquid inlet passage into the liquid container from the lower part of the separator chamber, a liquid outlet passage from the lower part of the liquid container to the exterior of the separator chamber, inlet and outlet valves in the passages, a float in the liquid container adapted to float on liquid in the liquid container, a float arm rigidly connected at one end to the float, a rotatably supported control arm rigidly secured to the other end of the float arm, an adjustable engaging member disposed exteriorly of the separator chamber and rigidly secured to the control arm, a pilot valve assembly, a snap acting assembly connected to and actuating said pilot valve assembly, said snap acting assembly engageable by said adjustable engaging member for actuating said pilot valve assembly, and a pressure system actuated by said pilot valve assembly for actuating the inlet and outlet valves whereby movement of said float in one direction simultaneously closes and opens said inlet and outlet valves respectively, and movement of said float in the other direction simultaneously opens and closes said inlet and outlet valves respectively.

11. In a liquid metering separator the improvement comprising, a separator chamber adapted to receive a liquid and a gas; and a liquid metering unit including a liquid container positioned within the separator chamber so as to be contained within the liquid in the separator chamber, said liquid container having a main storage chamber and mutually aligned liquid compartments extending above and below said main storage compartment, said mutually aligned compartments being of materially smaller cross section than that of said main storage compartment and being in liquid communication therewith, a liquid inlet passage into the liquid container from the lower part of the separator chamber, a liquid outlet passage from the lower part of the liquid container to the exterior of the separator chamber, inlet and outlet valves in the passages, a buoyancy member comprised of a pair of buoyancy masses rigidly connected together, one of each said buoyancy masses being disposed in one of each of the said mutually aligned compartments, said buoyancy masses movable with changing liquid level into and from said mutually aligned compartments, and valve control mechanism exterior of the separator chamber actuated by movement of said buoyancy member in one direction for simultaneously opening and closing the inlet and outlet valves respectively, and for simultaneously closing and opening the inlet and outlet valves respectively, upon movement of said buoyancy member in the other direction.

References Cited in the file of this patent
UNITED STATES PATENTS

| | | |
|---|---|---|
| 2,158,381 | Raymond | May 16, 1939 |
| 2,211,282 | McKeever | Aug. 13, 1940 |
| 2,794,342 | Franklin | June 4, 1957 |